(12) United States Patent
Orthner et al.

(10) Patent No.: US 7,844,761 B1
(45) Date of Patent: Nov. 30, 2010

(54) FLEXIBLE ON-CHIP DATAPATH INTERFACE FOR FACILITATING COMMUNICATION BETWEEN FIRST AND SECOND INTERFACES WITH DIFFERENT INTERFACE PROPERTIES

(75) Inventors: Kent Orthner, Kanta (CA); Desmond Ambrose, Ottawa (CA); Andrew M. Draper, Chesham (GB)

(73) Assignee: Altera Corporation, San Jose, CA (US)

( * ) Notice: Subject to any disclaimer, the term of this patent is extended or adjusted under 35 U.S.C. 154(b) by 553 days.

(21) Appl. No.: 11/432,275

(22) Filed: May 10, 2006

(51) Int. Cl.
*G06F 13/00* (2006.01)
*G06F 15/16* (2006.01)
*G06F 9/44* (2006.01)

(52) U.S. Cl. .................. 710/62; 710/8; 710/9; 710/10; 716/117; 716/118; 716/119; 717/120; 719/311; 719/321

(58) Field of Classification Search ............... 710/8–10, 710/62; 716/117–119, 117–19; 713/1, 2; 717/120; 719/311, 321
See application file for complete search history.

(56) References Cited

U.S. PATENT DOCUMENTS

| | | | | |
|---|---|---|---|---|
| 6,609,195 B2 * | 8/2003 | Dover | ..................... | 713/100 |
| 7,246,185 B1 * | 7/2007 | Pritchard et al. | ............ | 710/110 |
| 7,523,444 B2 * | 4/2009 | Quinn et al. | ................ | 717/120 |
| 7,617,500 B2 * | 11/2009 | Astl et al. | .................... | 719/311 |
| 2002/0029303 A1 * | 3/2002 | Nguyen | ...................... | 709/327 |
| 2003/0126422 A1 * | 7/2003 | Dover | .......................... | 713/1 |

OTHER PUBLICATIONS

Glette et al., "A Flexible On-Chip Evolution System Implemented on a Xilinx Virtex-II Pro Device", Department of Informatics, University of Oslo, Sep. 19, 2005 (downloaded Apr. 18, 2007).

* cited by examiner

*Primary Examiner*—Tammara Peyton
(74) *Attorney, Agent, or Firm*—Weaver Austin Villeneuve & Sampson LLP

(57) ABSTRACT

Methods and apparatus are provided for allowing flexible on-chip datapath interfaces on a device. Datapath connections allow data streamlining without any knowledge of channels or packet boundaries. Flexible and modular interface adapters are used to allow component designers to efficiently provide interoperable components without having to adhere to a strict datapath interface specification. Interface adapters from an adapter library are instantiated and configured automatically when two components are connected.

24 Claims, 7 Drawing Sheets

FLEXIBLE ON-CHIP DATAPATH INTERFACE FOR FACILITATING COMMUNICATION BETWEEN FIRST AND SECOND INTERFACES WITH DIFFERENT INTERFACE PROPERTIES

BACKGROUND OF THE INVENTION

1. Field of the Invention

The present invention relates to on-chip datapath interfaces. In one example, the present invention relates to methods and apparatus for providing a flexible datapath interface that allows interconnection of a variety of components on a device.

2. Description of Related Art

A variety of interconnection mechanisms are used to connect components on a device such as a programmable chip. In some examples, a standard on-chip data path interface specification is defined and components such as intellectual property (IP) cores are configured to conform to the interface specification. For example, components must be configured to comply with a specific set of signals and particular timing requirements in order for components to operate with other components on a device.

Designers are forced to select only components that have support for particular standards or characteristics, preventing design flexibility. In other examples, standard crossing bridges are manually inserted into a design and components supporting particular standards are segregated onto different portions of a design.

Techniques and mechanisms for interconnecting components have significant limitations. Consequently, it is desirable to provide improved methods and apparatus for allowing connections between components by using a flexible datapath interface.

SUMMARY OF THE INVENTION

Methods and apparatus are provided for allowing flexible on-chip datapath interfaces on a device. Datapath connections allow simple data streams, as well as channelized or packet connections. Flexible and modular interface adapters are used to allow component designers to efficiently provide interoperable components without having to adhere to a strict datapath interface specification. Interface adapters from an adapter library are instantiated and configured automatically when two components are connected.

In one embodiment, a programmable chip includes a first component data interface associated with a first component and a first adapter data interface associated with a first adapter from an adapter library. The first component data interface includes computer readable first component data interface properties. The first adapter data interface includes first adapter data interface properties corresponding to first component data interface properties. A programmable chip system generator selects the first adapter from the adapter library upon reading first component data interface properties.

In another embodiment, a technique for generating a programmable chip is provided. A selection for a first component and a selection for a second component are received. The first component including a first component data interface is provided. The first component data interface includes computer readable first component data interface properties. The second component including a second component data interface is provided. The second component data interface includes computer readable second component data interface properties. A first adapter is selected from an adapter library upon determining first component data interface properties and second component data interface properties.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which illustrate specific embodiments of the present invention.

DETAILED DESCRIPTION OF SPECIFIC EMBODIMENTS

Figure 1:
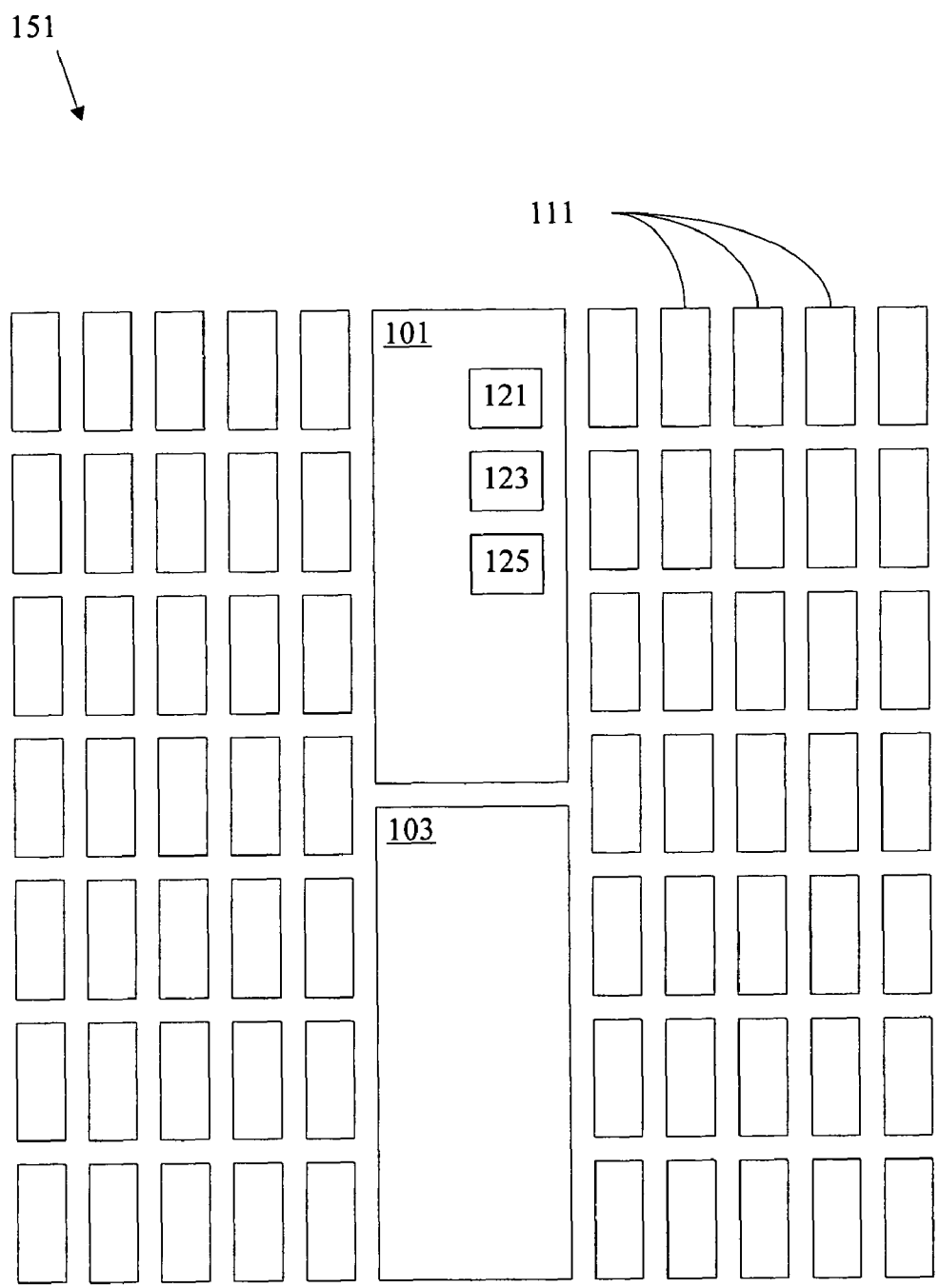
FIG. 1 is a diagrammatic representation of a programmable chip.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of programmable chips. However, it should be noted that the techniques of the present invention can be applied to a variety of devices. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Furthermore, techniques and mechanisms of the present invention will sometimes be described in singular form for clarity. However, it should be noted that some embodiments include multiple iterations of a technique or multiple instantiations of a mechanism unless noted otherwise. For example, a processor is used in a variety of contexts. However, it will be appreciated that multiple processors can also be used while remaining within the scope of the present invention unless otherwise noted.

Components on a device have source and sink data interfaces that allow efficient data transfers on a device. Any interface operable to carry high throughput packet, stream, or DSP traffic is referred to herein as a data interface. A datapath associated with many applications includes primarily data interfaces. A data interface is distinct from control, credit, and request interfaces. Control interfaces typically allow lower throughput data transfers and involve master and slave component read and write accesses. Credit interfaces provide buffer level information to a source data interface and request interfaces obtain information from buffers.

One component may include data interfaces as well as control, credit, and request interfaces. Other components may similarly include a variety of interfaces. A data interface is typically configured to meet a particular set of requirements. For example, in order to connect to a particular datapath, a data interface may be required to support particular width, bursting, and latency attributes.

In conventional systems, data interface compatibility in a system is ensured by using only IP blocks that implement components with data interfaces that conform to a particular standard or set of characteristics. Any set of characteristics or parameters associated with a component connection to a bus or other interconnection fabric is referred to herein as interface characteristics. IP blocks are compatible by construction, but a system designer faces limitations. For example, one limitation is that the number of IP blocks supporting an interface specification may be limited. Using a single interface specification, the designer will have a less than optimal design. If the designer decides to use an IP block with an incompatible interface, the designer will need to spend resources designing a "gasket" or "converter" that converts one data interface to another.

The techniques and mechanisms of the present invention recognize that another limitation is decreased performance or increased resource usage. Some IP blocks are designed to support multiple data interface types. For example, one data interface may support bursting and non-bursting transactions. But these more complicated requirements tend to complicate the interface circuitry of IP blocks because interfaces must be aware of all transaction types, thereby decreasing system performance or increasing the cost of the IP. The techniques and mechanisms of the present invention recognize that the limitations are most pronounced when IP is targeted at programmable chips such as FPGAs. Rich interface standards supporting a variety of attributes require complex circuitry that is relatively expensive on programmable chips in order to differentiate among a variety of transaction types.

Bridges and custom circuitry can also be used to convert from one interface type to another. However, adding bridges and custom circuitry is error prone, inefficient, and non-optimal. According to various embodiments, the techniques of the present invention analyze interface requirements and connections required by system components. Interface adapters available from a library of interface adapters are automatically selected for connecting interface types associated with different components. In some instances, multiple stages of interface adapter components may be selected to allow connection of system components. The interface adapters support a rich set of attributes including parameters associated with data transfers, bursting transfers, frame transfers, credit transfers, request transfers, multichannel transfers, etc. According to various embodiments, data interfaces support low latency, high throughput transfers with multiple channel support and flexible packet interleaving. Support is provided for data bursting and sideband signaling of control signals such as channel, error, and start and end of packet delineation. Multichannel credit and request interfaces can be implemented. Interface adapters allowing interconnection of components are automatically selected.

FIG. 1 is a diagrammatic representation showing one example of a programmable chip that can use the techniques of the present invention. Any device such as a Field Programmable Gate Array (FPGA) or a Programmable Logic Device (PLD) that is configurable using a hardware descriptor language (HDL) such as Verilog or VHDL is referred to herein as a programmable chip. A programmable chip 151 includes hard coded logic blocks 101 and 103. In some examples, the hard coded logic blocks 101 and 103 are DSP blocks that can efficiently implement multiplication, multiply-accumulate (MAC) and multiply-add functions. In one example, the hard coded logic block 101 includes a multiplier 121, an adder 123, and an accumulator 125. The multipliers can be configured to feed an adder or an accumulator.

According to various embodiments, the DSP block 101 also has input registers that can be configured to operate in a shift register chain for efficient implementation of functions like FIR filters. The programmable chip also includes logic array blocks (LABs), logic cells, or logic elements 111. The programmable chip uses different types of resources that can be interchangeably used in different allocations to implement a programmable chip. In one example, the programmable chip uses logic elements for implementing each of the various components on the programmable chip.

Logic elements typically can be implemented using components such as antifuses, static RAM, and EPROMS. Any mechanism on a programmable chip that performs an operation on a given number of input lines to provide one or more outputs based on information programmed is herein referred to as a logic element. Some logic elements are implemented as combinations of look up tables and switches for performing Boolean operations on input lines. In one example, a logic element includes a 16-bit SRAM lookup table (LUT) that can implement an arbitrary 4-input logic function, circuitry that forms a fast carry chain and a fast cascade chain, a register and preset/reset logic for the register.

The programmable chip 151 can also include other components such as a hard coded processor or memory. Alternatively, logic elements can also be used to implement soft processors as well as other components such as hardware accelerators, peripheral devices, and peripheral interfaces. Peripheral devices and peripheral interfaces are herein referred to as components. In some embodiments, a system on a programmable chip can be implemented on the programmable chip 151. The programmable chip system components are connected using one or more interconnection fabrics. Any mechanism or logic for connecting components in a system is referred to herein as an interconnection fabric. In one example, the interconnection fabric is a bus. In another example, the interconnection fabric is a fabric that actively selects interface adapters to allow components with incompatible data interfaces to connect.

Figure 2:
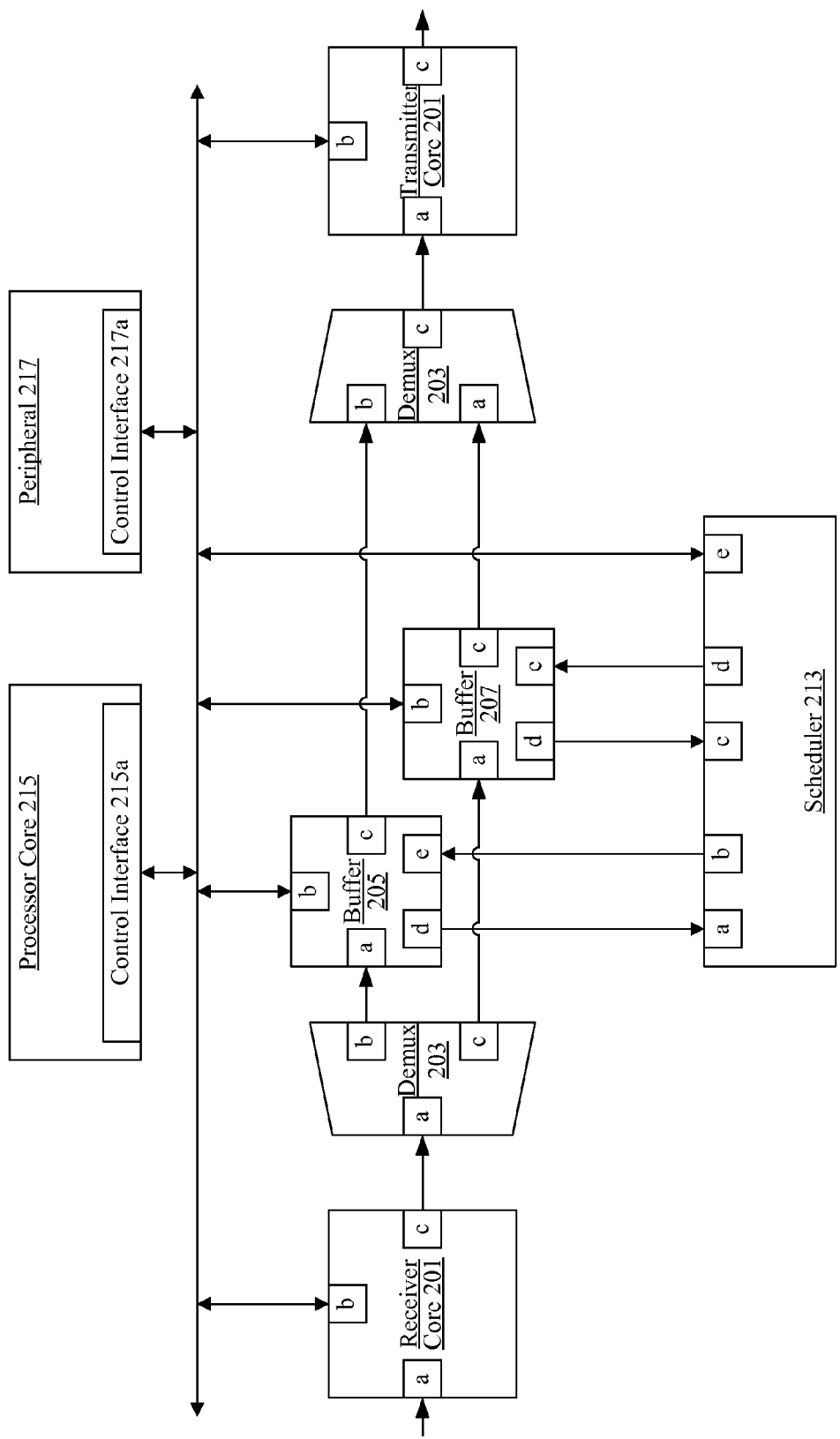
FIG. 2 is a diagrammatic representation showing one example of a programmable chip including components having data interfaces.

FIG. 2 is a diagrammatic representation showing one example of a programmable chip including components having data interfaces. The programmable chip includes a receiver 201. The receiver includes an external interface 201a, a control path interface 201b, and a data interface 201c. The external interface 201a is used to communicate with off-chip components. The control interface 201b is used to communicate with a processor core 215 through processor core control interface 215a and is also used to communicate with a peripheral 217 through peripheral control interface 217a. According to various embodiments, the control interface is associated with a Peripheral Components Interface (PCI) bus. In other examples, the control interface is associated with a slave side arbitration fabric or a simultaneous multiple master bus. The receiver data interface 201c is used to carry high throughput, low latency, packet, streaming, or DSP traffic. The receiver data interface 201c is connected to a demultiplexer 203 through demultiplexer data interface 203a.

The demultiplexer 203 also includes data interfaces 203b and 203c connected to data buffer 205 through data buffer data interface 205a and data buffer 207 through data buffer data interface 207a respectively. Buffers 205 and 207 also include control interfaces 205b and 207b respectively. Credit interfaces 205d and 207d are used to communicate with scheduler 213 through scheduler credit interfaces 213a and 213c. The credit interfaces are used to communicate the availability of data on an associated data interface, or alternatively, the ability of the interface to receive data. An interface that grants credits to indicate the amount of data it has available is referred to herein as a credit producer. A credit interface that reads credits from a credit producer is referred to herein as a credit consumer. Request interfaces 205e and 207e are used to communicate with scheduler 213 through scheduler request interfaces 213b and 213d. The request interfaces are used to request data from an associated data interface. According to various embodiments, credit and request interfaces are control interfaces with defined data formats. The scheduler also has a control interface 213e.

Parameters are used to specify attributes associated with an interface. According to various embodiments, each parameter defines an attribute such as a signal's width, or it defines an attribute of the entire interface such as a read_latency parameter. A parameter can also be used to specify a signal type. A variety of signals and signal characteristics are supported in a variety of transmission environments.

A transfer is an operation that results in data and control being propagated from a source interface to a sink interface during one or more clock cycles. A clock cycle is a clock period. For data interfaces, a ready cycle is a cycle during which the sink can accept a transfer. A beat is the transfer of one unit of data from a source to a sink. For credit and request interfaces, transfers are read and write operations respectively. A symbol is the smallest atomic unit of data. A packet is an aggregation of data and control signals that is transmitted and switched as a composite whole. Packets can have variable length. A burst executes multiple transfers as a unit, rather than treating each cycle as an independent transfer. Bursts allow more efficient transfers. A continuous burst provides that the source will send a minimum amount of data without inserting idle cycles. A channel burst provides that the source will send a minimum amount of data without interleaving data for other channels. Once a source begins a channel burst transfer, it guarantees that no data will be sent for any other channel until the burst is complete. For components that support multiple channels, the credit and request interfaces can be used to communicate the credits available for multiple flows, where a flow is a collection of channels that share credit information.

A variety of components including components that support a variety of interfaces are available in a component library associated with a system generator tool such as System On A Programmable Chip (SOPC) Builder available from Altera Corporation of San Jose, Calif.

Figure 3:
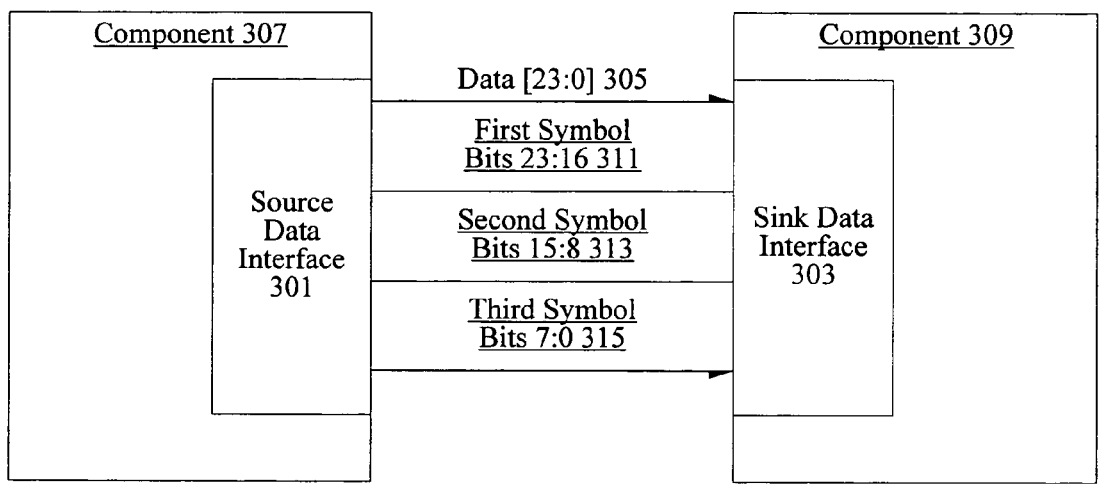
FIG. 3 is a diagrammatic representation showing one example of a data source interface and a data sink interface.

FIG. 3 is a diagrammatic representation showing one example of a data transfer between a source data interface and a sink data interface. A component 307 is associated with a source data interface 301 and a component 309 is associated with a sink data interface 303. According to various embodiments, a valid signal is used to qualify valid data on cycles where data is being transferred from a source data interface 301 to a sink data interface 303. On cycles where a valid signal is asserted, typically called beats, the data bus 305 and other source to sink signals are sampled by the sink 303. On cycles when valid is deasserted, the sink does not sample signals. On interfaces that support backpressure, a ready signal is asserted by the sink 303 to mark ready cycles. A ready_latency parameter can be used to specify the relationship between the ready signal and ready cycles. A data signal typically carries the bulk of the information being transferred from a source to a sink and includes one or more symbols being transferred on every clock cycle. In one example, a first symbol 311, a second symbol 313, and a third symbol 315 are all transferred during a particular cycle. A symbol-type parameter may optionally be defined to specify the type of data being carried. Error signals can also be provided to show possible error conditions.

In conventional datapath specifications, all components are configured to support a particular set of requirements. For example, all components are required to support backpressure, or all components are required have the same value of read_latency. However, this prevents implementation flexibility. The techniques of the present invention allow flexibility in providing components with different interfaces.

Figure 4:
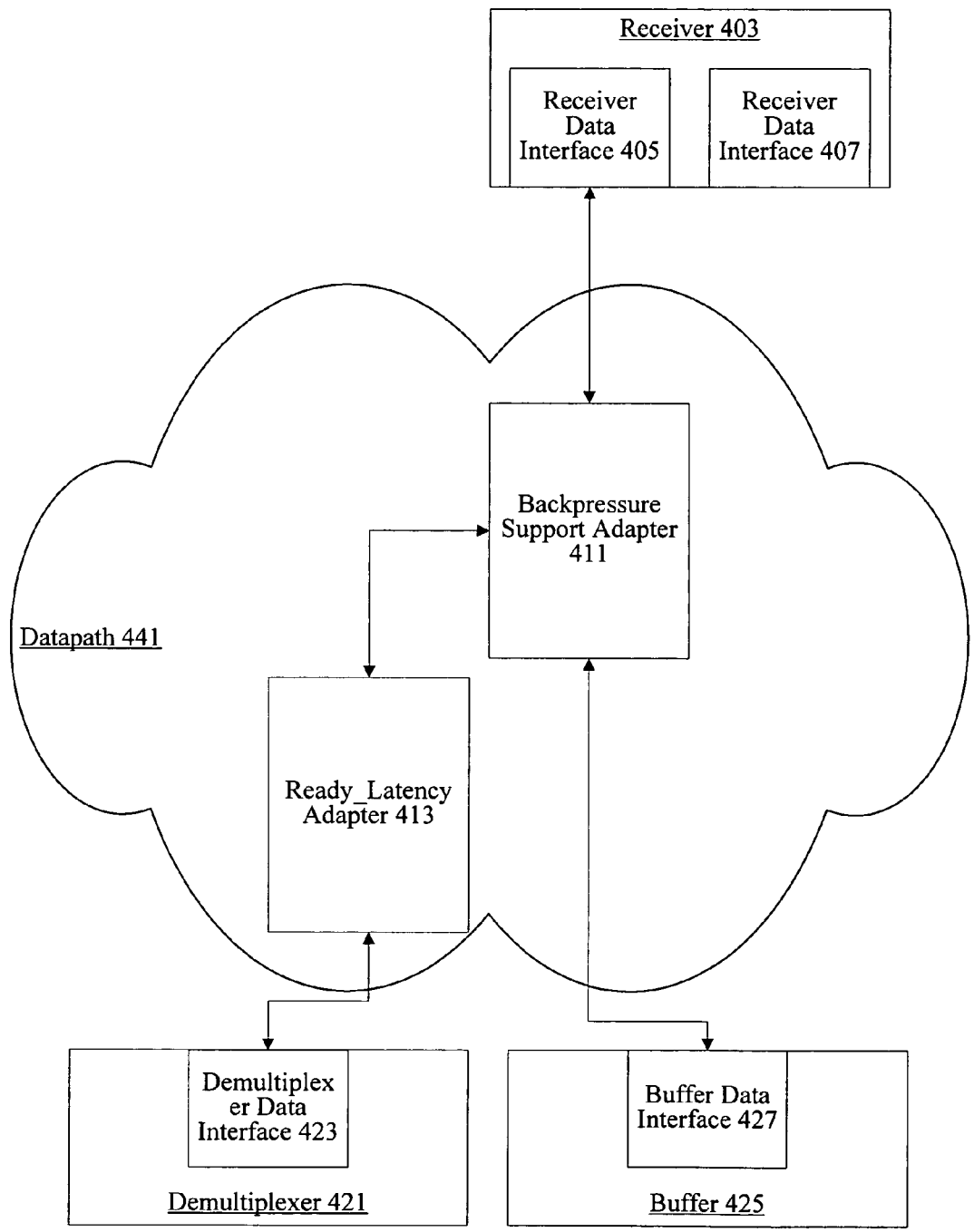
FIG. 4 is a diagrammatic representation depicting one example of an interface adapter.

FIG. 4 is a diagrammatic representation showing use of interface adapters. Any mechanism holding logic such as IP blocks for implementing interface adapters on a device is referred to herein as an interface adapter library. In one embodiment, an interface adapter library is a database that includes bursting adapters, backpressure adapters, error signal adapters, credit adapters, request adapters, etc.

A receiver 403 includes a receiver data interface 405 and a receiver data interface 407. The receiver data interface 405 is connected to both a demultiplexer 421 through a demultiplexer data interface 423 and to a buffer 425 through buffer data interface 427 over a datapath 441. According to various embodiments, the techniques of the present invention automatically select adapters from a library of interface adapters. A backpressure support adapter 411 is used to allow connection between the receiver 403 and a buffer 425 through buffer data interface 427. A ready_latency adapter 413 and the backpressure support adapter 411 are chained to allow connection between receiver 403 and demultiplexer 421. The preconfigured interface adapters reduce complexity in implementing a device. However, it is recognized that latency may increase.

Interface adapters available from a library may not be optimally configured for specific applications and may indeed slow transfers of data between the receiver 403 and the demultiplexer 421 and the buffer 425. However, the techniques of the present invention recognize that the tradeoff is beneficial particularly when implemented using a system builder tool. A system builder or system design tool allowing a designer to select components for implementing a system on a chip or a system on a programmable chip emphasizes simplicity of design over latency. For more optimal latency, components having compatible interfaces can be designed.

Sharing of adapters is encouraged by considering total cost. A system implemented using fewer adapters will generally have lower total cost. However, in some instances, sharing too extensively can adversely impact system performance. In some instances, the interface adapter itself may become a system bottleneck. Consequently, sharing of adapters is limited for high bandwidth components.

Components have a variety of signals and parameters that may cause compatibility problems. According to various embodiments, signals include clock, valid, ready, error, startofpacket, endofpacket, empty, channel, startofframe, emptybeat, and reset signals. According to various embodiments, parameters include width, symbol_type, symbols_per_beat, ready_latency, cycles_per_beat, symbols_ per_continuous_burst, packets_per_continuous_burst, max_channel, symbols_per_channel, packets_per_channel, is_required, default_value, and treat_as parameters. Any two components can have incompatibilities between signals and parameters. The following tables show some examples of interface adapters that can be provided in an interface adapter library to connect incompatible components. In some instances, no adapter is required. In other instances, no adapter logic is available to make components compatible.

TABLE 1

Backpressure And Ready_Latency Adapters

| Condition | Description of Adapter Logic |
| --- | --- |
| The source supports backpressure, but the sink does not. | This means that the source will respond to backpressure, but the sink does not need to apply it. The ready input to the source interface will be connected directly to '1'. |
| The source does not support backpressure, but the sink does. | This means that the sink may apply backpressure, but the source is unable to respond to it. There is no logic that the adapter can insert that will prevent data loss when the source asserts valid but the sink is not ready. The components can not be connected. |
| The source and sink both support backpressure, and have the same value for ready_latency. | No adaptation necessary. |
| The source and sink both support backpressure, but the sink's ready_latency parameter is greater than the source's. | The source responds to ready assertion or deassertion faster than the sink requires it. A number of pipeline stages equal to the ready_latency difference will be inserted in the ready path from the sink back to the source, causing the source and the sink to see the same cycles as ready cycles. |
| The source and sink both support backpressure, but the sink's ready_latency parameter is less than the source's. | The source can not respond to ready assertion or deassertion fast enough to satisfy the sink. A buffer whose depth is equal to the ready_latency difference is inserted to compensate for the source's inability to respond in time. |

TABLE 2

Error Adaptations

| Condition | Description of Adapter Logic |
| --- | --- |
| The source supports error, but the sink does not. | The error output from the source is left unconnected, and any errors reported by the source interface are lost. This may indicate a problem with the system design. |
| The source does not support error, but the sink does. | The error inputs to the sink are all tied to 0. |
| The source and sink both support error. | The adapter follows the following steps: For each bit in the sink's error for which there is a matching condition in the source's error, the bits are connected. If the sink's error has an "unknown" condition, a logical OR is performed on remaining source error conditions connected to it. If the sink's error has no "unknown" condition, all remaining source error conditions are left unconnected. |

TABLE 3

Multi-Cycle Beat Adaptations

| Condition | Description of Adapter Logic |
| --- | --- |
| The source's cycles_per_beat is greater than the sink's. | The valid input to the sink is deasserted once the sink's cycles_per_beat is satisfied. The source's symbols_per_continuous_beat parameter is treated as though it were equal to a beat. |
| The source's cycles_per_beat is less than the sink's. | The adapter holds the data from the source and asserts valid to the sink until the sink's cycles_per_beat is satisfied. The ready input to the source is deasserted so that the source waits. If the source does not support backpressure, an error is generated, and the cores cannot be connected. |

TABLE 4

Burst Adaptations

| Condition | Description of Adapter Logic |
| --- | --- |
| The source's symbols_per_continuous_burst is an integer multiple of the sink's. | Every burst from the source translates into an integer number of bursts to the sink. No adaptation is necessary. |
| The source's symbols_per_continuous_burst is not an integer multiple of the sink's. | Per-port buffering is used to adapt to this condition. If no per-port buffering is available, a message recommending that the user instantiate a component that supports per-port buffering is provided. |

TABLE 5

Channel Adaptations

| Condition | Description of Adapter Logic |
| --- | --- |
| The source is channelized with channel or startofframe, but the sink is not. | The user is warned that the interfaces are incompatible, and should not be connected. The channel outputs from the source are left unconnected. |
| The sink is channelized with channel, and the source is not channelized. | The user is presented with a warning, and the channel inputs to the sink are all tied to $0^{10}$. |
| The sink is channelized with startofframe, but the source is not. | The user is warned that the interfaces are incompatible, and can not be connected. The connection fails. |
| The source and sink both support channel, and the source's max_channel is less than the sink's max_channel. | The source's channel is connected to the sink's channel unchanged. If the sink's channel signal has more bits, then the higher bits are tied to '0'. |
| The source and sink both support channel, and the source's max_channel is greater than the sink's max_channel. | The source's channel is connected to the sink's channel unchanged. If the source's channel signal has more bits, than the higher bits are left unconnected. The user is presented with a warning that channel information may be lost. If the value of the channel output from the source is greater than the sink's max_channel parameter, the valid signal to the sink is deasserted, such that the sink never sees data for channels higher than it's max_channel parameter. |

TABLE 5-continued

Channel Adaptations

| Condition | Description of Adapter Logic |
|---|---|
| The source and sink both support channel, and the source's symbols_per_channel is an integer multiple of the sink's. | No adaptation is necessary. |
| The source and sink both support channel, and the source's symbols_per_channel is not an integer multiple of the sink's. | Per-port buffering is used to adapt to this condition. If no per-port buffering is available, a message recommending that the user instantiate a component that supports per-port buffering is provided. |
| The source and sink both support startofframe, and the source's max_channel or symbols_per_channel is different than the sink's. | A timeslot reassignment component is used for adaptation. If no timeslot reassignment component is available, a message recommending that the user instantiate an appropriate component is provided. |
| The source and sink both support startofframe, and the source supports emptybeats, but the sink does not. | The user is warned that information regarding which beats are empty will be lost by the sink. The emptybeat output from the source is left unconnected. |
| The source and sink both support startofframe, and the sink supports emptybeats, but the source does not. | The emptybeat input to the sink is tied low, since the source never provides empty beats. |
| The source supports startofframe, and the sink supports channel. | The adapter generates channel number for the sink if symbols_per_channel and max_channel are compatible. Otherwise, the users is presented with a message recommending that the user instantiate a VQC. |
| The source supports channel, and the sink supports startofframe. | The adapter can not adapt for this automatically. The user is presented with an error and the connection fails. |

TABLE 6

Component-Specific Signal Adaptations

| Condition | Description of Adapter Logic |
|---|---|
| The source and sink have a signal with the same type, width, treat_as and matching directions. | The signals are directly connected to one another. |
| The source and sink have a signal with the same type, but the width, treat_as parameter, or direction does not match. | The connection fails. |
| The source or sink has a signal that the adjacent interface does not have, and the signal's is_required parameter is '1'. | The connection fails. |
| The source or sink has an output signal that the adjacent interface does not have, and the signal's is_required parameter is '0'. | The output signal is left unconnected. |
| The source or sink has an input signal that the adjacent interface does not have, and the signal's is_required parameter is '0'. | The input signal is assigned a constant value equal to it's default_value parameter. |

Tables 1-6 describe interface adapters that can be used for connecting component data interfaces. The techniques of the present invention also provide interfaces adapters that can be used for connecting credit and request interfaces. Tables 7 and 8 show examples of some interface adapters that can be inserted between credit and request interfaces. According to various embodiments, credit and request interfaces are associated with a control path and connected to a fabric or bus such as a simultaneous multiple master fabric or a slave side arbitration fabric.

TABLE 7

Credit Specific Adaptations

| Condition | Description of Adapter Logic |
|---|---|
| Fabric Data_Width parameters don't Match | A control path bus width adapter is provided. If the credit sink's interface is wider than the credit source's, there is a loss in status throughput that may affect system performance. |
| The credit_type of the credit producer does not match that of the credit consumer, or the credit producer does not have it defined. | The interfaces can not be connected. |
| The credit_width of the credit producer is less than that of the credit consumer. | The adapter maintains the high order bits of the credit counter, incrementing when it detects a 1-to-0 transition on the highest bit from the credit source. |
| The credit_width of the credit producer is greater than that of the credit consumer. | The interfaces can not be connected. |
| The max_flow of the credit producer is greater than that of the consumer. | At system design time, the user is warned that the max_flow parameters do not match. |
| The max_flow of the credit producer is less than that of the Consumer. | The connection fails to prevent the case where the consumer tries to read credits for a flow that doesn't exist. |
| One component uses symbols_per_credit, and the other uses packets_per_credit | The connection fails. |
| The components use different values for symbols_per_credit | The value of the credit grant is modified so that the correct number of symbols is seen by the consumer, as long as the resulting credit grant is always for an integer number of beats. If this can not be guaranteed, the connection fails. |

TABLE 8

Request Specific Adaptations

| Condition | Description of Adapter Logic |
|---|---|
| The request_width of the request source is less than that of the request sink. | The request from the source is zero-extended, and connected to the sink. |
| The request_width of the request source is greater than that of the request sink. | The request from the request source is truncated, and connected to the sink. If a request is made of a size greater than that which can be expressed with the remaining bits, the adapter will assert waitrequest to the request master and will provide multiple requests to the slave. |
| The max_flow of the request master Does not match that of the request slave. | At system design time, the user is warned that the max_flow parameters do not match. The signals are connected directly. |
| One component uses symbols_per_request, and the other uses packets_per_request | The connection fails. |
| The components use different values for symbols_per_request | The value of the request is modified so that the correct number of symbols match, as long as the resulting request is always for an integer number of beats. If this can not be guaranteed, the connection fails. |

Figure 5:
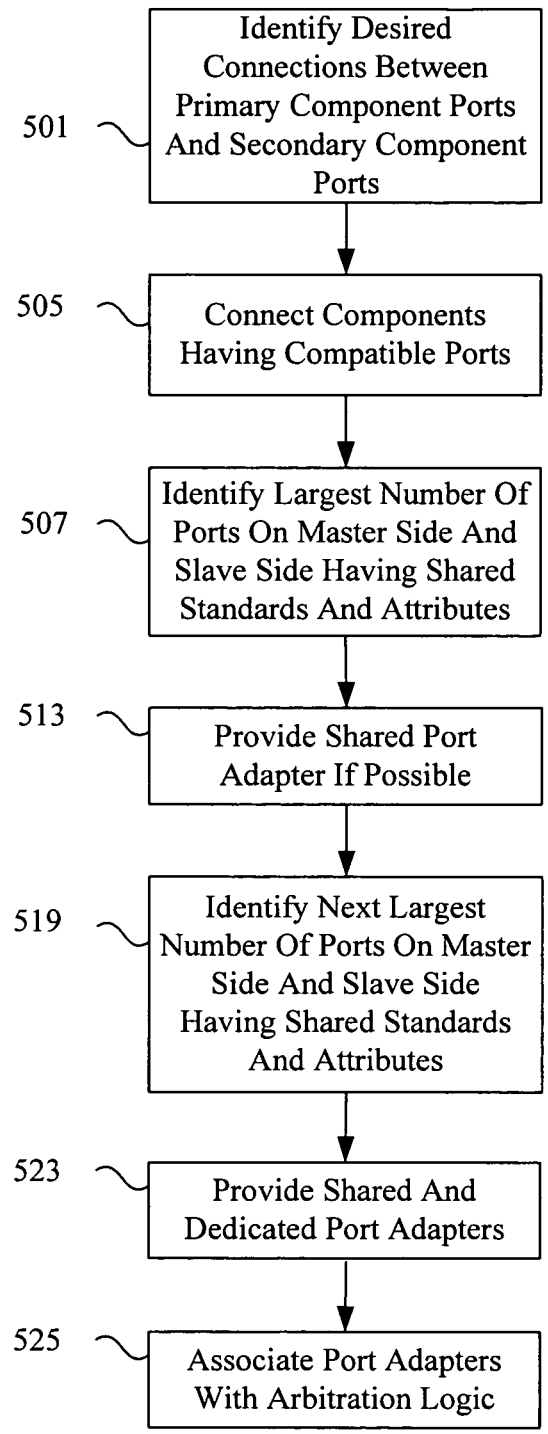
FIG. 5 is a flow process diagram showing one technique for implementing adapters.

FIG. 5 is a flow process diagram showing one technique for implementing a system using port adapters. At 501, desired connections between primary component ports and secondary components ports are identified. At 505, components having available compatible ports are connected. At 507, the largest number of remaining ports on the master side and/or slave side having shared standards and attributes are identified. A shared port adapter is provided if possible at 513. At 519, the next largest number of remaining unconnected ports on the master side and/or slave side having shared standards and attributes are identified and a shared port adapter is provided. At 523, additional shared and dedicated port adapters are provided. At 525, port adapters are associated with arbitration logic. It should be noted that a variety of techniques are contemplated for selecting ports adapters. Iterative, cot weighting, and graphing techniques can be used.

Figure 6:
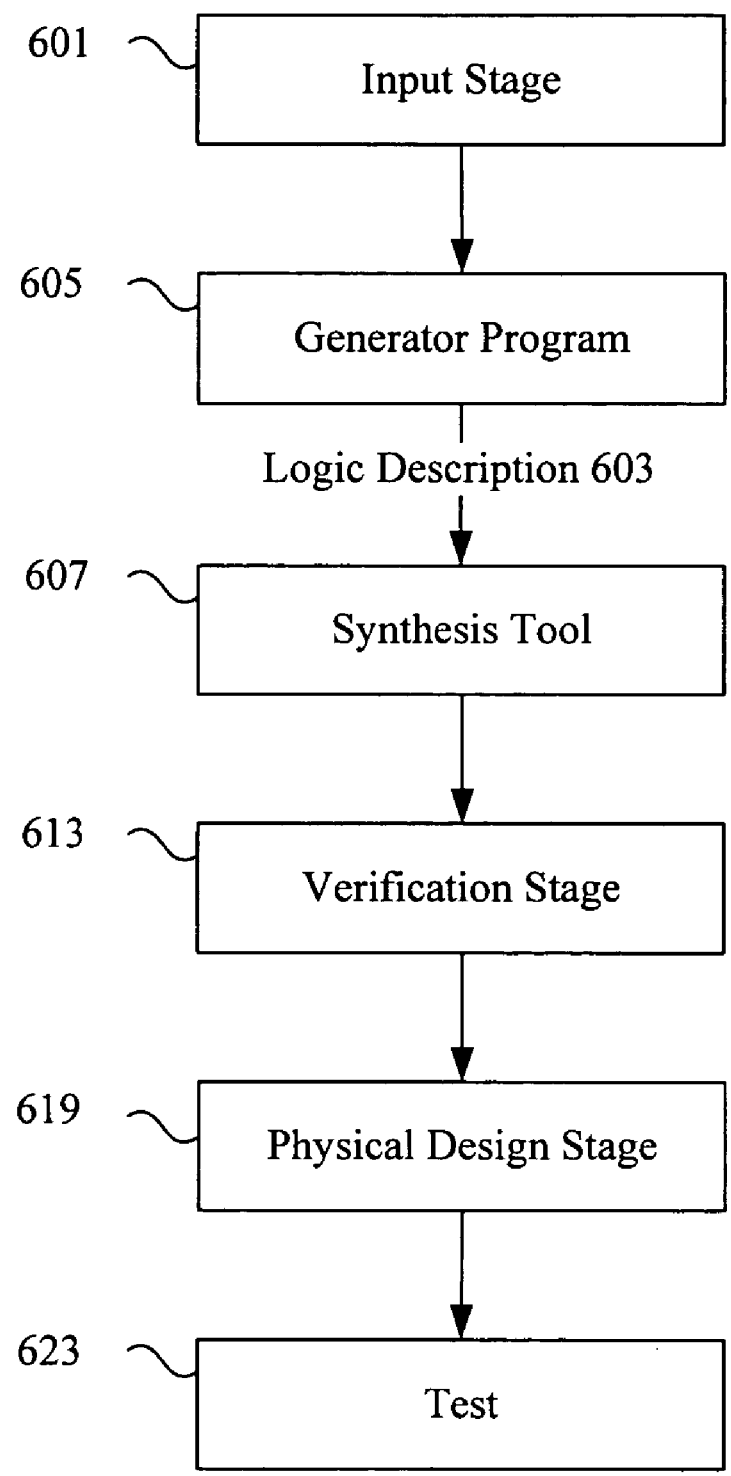
FIG. 6 is a diagrammatic representation showing one technique for implementing a programmable chip.

FIG. 6 is a diagrammatic representation showing implementation of an electronic device that can use arbitration logic according to various embodiments. An input stage 601 receives selection information typically from a user for logic such as a processor core as well as other components such as a streaming output device to be implemented on an electronic device. In one example, the input received is in the form of a high-level language program. A generator program 605 creates a logic description and provides the logic description along with other customized logic to any of a variety of synthesis tools, place and route programs, and logic configuration tools to allow a logic description to be implemented on an electronic device.

In one example, an input stage 601 often allows selection and parameterization of components to be used on an electronic device. The input stage 601 also allows configuration of variable or fixed latency support. In some examples, components provided to an input stage include intellectual property functions, megafunctions, and intellectual property cores. The input stage 601 may be a graphical user interface using wizards for allowing efficient or convenient entry of information. The input stage may also be a text interface or a program reading a data file such as a spreadsheet, database table, or schematic to acquire selection information. The input stage 601 produces an output containing information about the various modules selected.

In typical implementations, the generator program 605 can identify the selections and generate a logic description with information for implementing the various modules. The generator program 605 can be a Perl script creating HDL files such as Verilog, Abel, VHDL, and AHDL files from the module information entered by a user. In one example, the generator program identifies a portion of a high-level language program to accelerate. The other code is left for execution on a processor core. According to various embodiments, the generator program 605 identifies pointers and provides ports for each pointer. One tool with generator program capabilities is System on a Programmable Chip (SOPC) Builder available from Altera Corporation of San Jose, Calif. The generator program 605 also provides information to a synthesis tool 607 to allow HDL files to be automatically synthesized. In some examples, a logic description is provided directly by a designer. Hookups between various components selected by a user are also interconnected by a generator program. Some of the available synthesis tools are Leonardo Spectrum, available from Mentor Graphics Corporation of Wilsonville, Oregon and Synplify available from Synplicity Corporation of Sunnyvale, Calif. The HDL files may contain technology specific code readable only by a synthesis tool. The HDL files at this point may also be passed to a simulation tool.

As will be appreciated by one of skill in the art, the input stage 601, generator program 605, and synthesis tool 607 can be separate programs. The interface between the separate programs can be a database file, a log, or simply messages transmitted between the programs. For example, instead of writing a file to storage, the input stage 601 can send messages directly to the generator program 605 to allow the generator program to create a logic description. Similarly, the generator program can provide information directly to the synthesis tool instead of writing HDL files. Similarly, input stage 601, generator program 605, and synthesis tool 607 can be integrated into a single program.

A user may select various modules and an integrated program can then take the user selections and output a logic description in the form of a synthesized netlist without intermediate files. Any mechanism for depicting the logic to be implemented on an electronic device is referred to herein as a logic description. According to various embodiments, a logic description is an HDL file such as a VHDL, Abel, AHDL, or Verilog file. A logic description may be in various stages of processing between the user selection of components and parameters to the final configuration of the device. According to other embodiments, a logic description is a synthesized netlist such as an Electronic Design Interchange Format Input File (EDF file). An EDF file is one example of a synthesized netlist file that can be output by the synthesis tool 607.

A synthesis tool 607 can take HDL files and output EDF files. Tools for synthesis allow the implementation of the logic design on an electronic device. Some of the available synthesis tools are Leonardo Spectrum, available from Mentor Graphics Corporation of Wilsonville, Oregon and Synplify available from Synplicity Corporation of Sunnyvale, Calif. Various synthesized netlist formats will be appreciated by one of skill in the art.

A verification stage 613 typically follows the synthesis stage 607. The verification stage checks the accuracy of the design to ensure that an intermediate or final design realizes the expected requirements. A verification stage typically includes simulation tools and timing analysis tools. Tools for simulation allow the application of inputs and the observation of outputs without having to implement a physical device. Simulation tools provide designers with cost effective and efficient mechanisms for both functional and timing verification of a design. Functional verification involves the circuit's logical operation independent of timing considerations. Parameters such as gate delays are disregarded.

Timing verification involves the analysis of the design's operation with timing delays. Setup, hold, and other timing requirements for sequential devices such as flip-flops are confirmed. Some available simulation tools include Synopsys VCS, VSS, and Scirocco, available from Synopsys Corporation of Sunnyvale, Calif. and Cadence NC-Verilog and NC-VHDL available from Cadence Design Systems of San Jose, Calif. After the verification stage 613, the synthesized netlist file can be provided to physical design tools 619 including place and route and configuration tools. A place and route tool typically locates logic cells on specific logic elements of a target hardware device and connects wires between the inputs and outputs of the various logic elements in accordance with logic required to implement an electronic design. The device can also be physically tested at 623.

For programmable logic devices, a programmable logic configuration stage can take the output of the place and route tool to program the logic device with the user selected and parameterized modules. According to various embodiments, the place and route tool and the logic configuration stage are provided in the Quartus II Development Tool, available from Altera Corporation of San Jose, Calif. As will be appreciated by one of skill in the art, a variety of synthesis, place and route, and programmable logic configuration tools can be tested using various techniques of the present invention.

As noted above, different stages and programs can be integrated in a variety of manners. According to one embodiment, the input stage 601, the generator program 605, the synthesis tool 607, the verification tools 613, and physical design tools 619 are integrated into a single program. The various stages are automatically run and transparent to a user. The program can receive the user selected modules, generate a logic description depicting logic for implementing the various selected modules, and implement the electronic device. As will be appreciated by one of skill in the art, HDL files and EDF files are mere examples of a logic description. Other file formats as well as internal program representations are other examples of a logic description.

Figure 7:
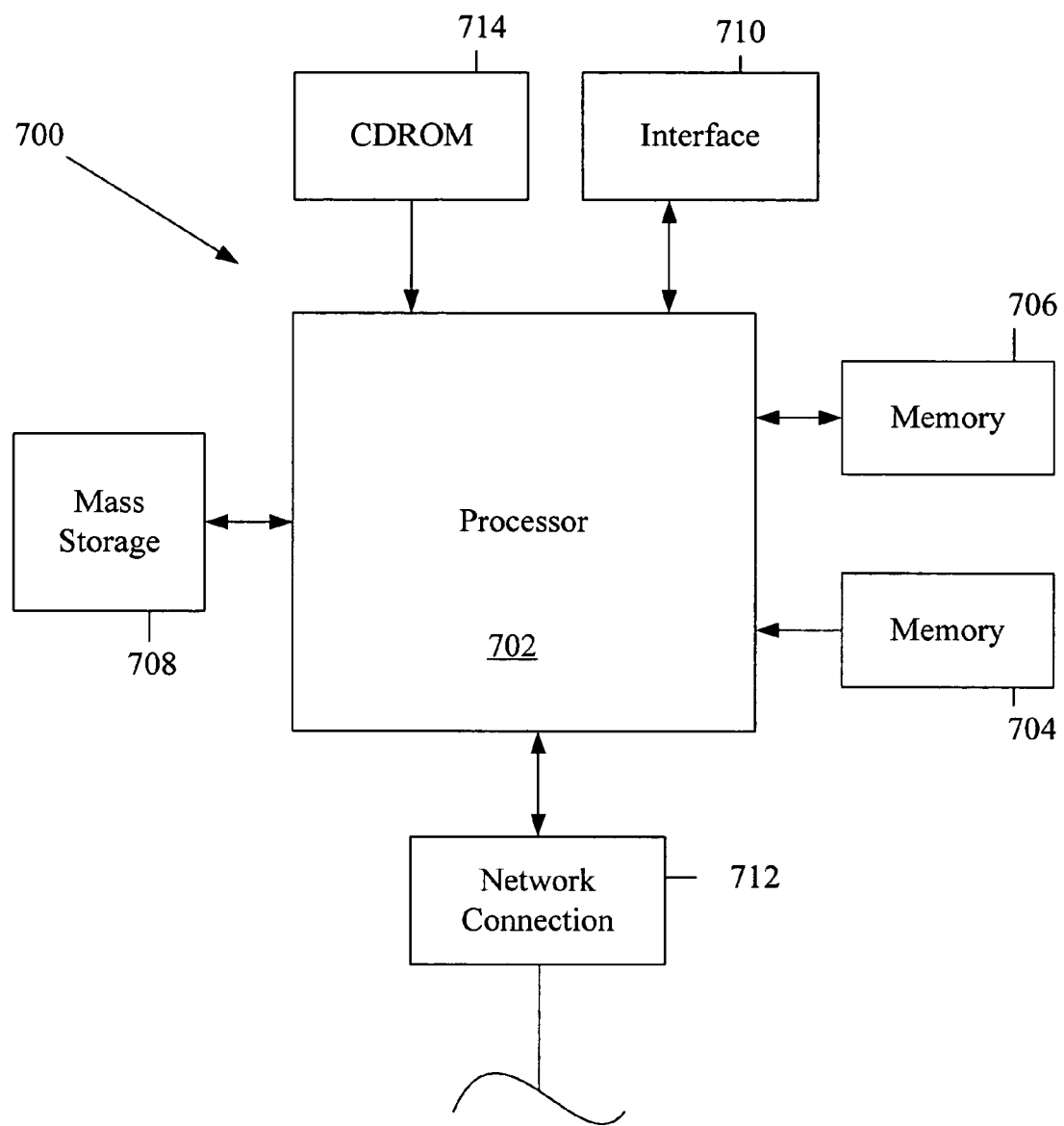
FIG. 7 is a diagrammatic representation depicting a computer system.

FIG. 7 is a diagrammatic representation showing a typical computer system that can be used to implement a programmable chip having bus arbitration with priority encoding and fairness. The computer system 700 includes any number of processors 702 (also referred to as central processing units, or CPUs) that are coupled to devices including memory 706 (typically a random access memory, or "RAM"), memory 704 (typically a read only memory, or "ROM"). The processors 702 can be configured to generate test sequences for any designated processor. As is well known in the art, memory 704 acts to transfer data and instructions uni-directionally to the CPU and memory 706 is used typically to transfer data and instructions in a bi-directional manner.

Both of these memory devices may include any suitable type of the computer-readable media described above. A mass storage device 708 is also coupled bi-directionally to CPU 702 and provides additional data storage capacity and may include any of the computer-readable media described above. The mass storage device 708 may be used to store programs, data and the like and is typically a secondary storage medium such as a hard disk that is slower than memory. The mass storage device 708 can be used to hold a library or database of prepackaged logic or intellectual property functions, as well as information on generating particular configurations. It will be appreciated that the information retained within the mass storage device 708, may, in appropriate cases, be incorporated in standard fashion as part of memory 706 as virtual memory. A specific mass storage device such as a CD-ROM 714 may also pass data uni-directionally to the CPU.

CPU 702 is also coupled to an interface 710 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 702 optionally may be coupled to a computer or telecommunications network using a network connection as shown generally at 712. With such a network connection, it is contemplated that the CPU might receive information from the network, or might output information to the network in the course of performing the above-described method steps. It should be noted that the system 700 may also be associated with devices for transferring completed designs onto a programmable chip. The above-described devices and materials will be familiar to those of skill in the computer hardware and software arts.

The hardware elements described above may be configured (usually temporarily) to act as multiple software modules for performing the operations of this invention. For example, instructions for running a generator program, input stage (e.g., a wizard), and/or compiler may be stored on mass storage device 708 or 714 and executed on CPU 708 in conjunction with primary memory 706.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of primary and secondary components and should not be restricted to the ones mentioned above. Although shared I/O lines have been described in the context of a memory controller and a simultaneous multiple primary component switch fabric, shared I/O lines can be used in a system without a memory controller and/or without a simultaneous multiple primary component switch fabric. It is therefore intended that the invention be interpreted to include all variations and equivalents that fall within the true spirit and scope of the present invention.

What is claimed is:

1. A programmable chip, comprising:
    a first component interface associated with a first component, the first component interface associated with computer readable first component interface properties;
    a first adapter interface associated with a first adapter having a representation within an adapter library, the first adapter interface having first adapter interface properties corresponding to the first component interface properties;
    a second component interface associated with a second component, the second component interface associated with computer readable second component interface properties;
    a programmable chip system generator configured to automatically select the representation of the first adapter from the adapter library upon reading the first component interface properties and the second component interface properties, wherein the first and second component interfaces are configured to communicate with each other and the first component interface properties are different from the second component interface properties.

2. The programmable chip of claim 1, further comprising a second adapter interface associated with the first adapter, the second adapter interface having second adapter interface properties corresponding to the second component interface properties.

3. The programmable chip of claim 2, wherein the first component interface properties include requirements for the second component interface properties.

4. The programmable chip of claim 1, wherein the first component interface properties include signal type.

5. The programmable chip of claim 1, wherein the first component interface properties include signal widths.

6. The programmable chip of claim 1, wherein the first component interface properties include signal direction.

7. The programmable chip of claim 1, wherein the first component interface properties include purpose and function of a signal type.

8. The programmable chip of claim 1, further comprising a plurality of interface adapters configured to support simple streams, packet streams, and frame streams, wherein the interface adapters have representations selected from the adapter library.

9. The programmable chip of claim 8, wherein the interface adapters are configured to support channelized transfers.

10. The programmable chip of claim 9, wherein the interface adapters are configured to support flexible frame formats.

11. The programmable chip of claim 10, wherein the interface adapters are configured to support multi-cycle beats.

12. The programmable chip of claim 11, wherein the interface adapters are configured to support continuous and channel burst mechanisms.

13. A method for generating a programmable chip, comprising:
receiving a selection for a first component data interface having computer readable first component data interface properties and a selection for a second component data interface including computer readable second component data interface properties;
generating at least a portion of the programmable chip by automatically selecting a representation of a first adapter from an adapter library, wherein said automatically selecting the representation is performed upon determining the first component data interface properties and the second component data interface properties, wherein the first and second component data interfaces are configured to communicate with each other and the first component data interface properties are different from the second component data interface properties.

14. The method of claim 13, wherein the first component data interface properties include requirements for the second component data interface properties.

15. The method of claim 13, wherein the first component data interface properties include signal type.

16. The method of claim 13, wherein the first component data interface properties include signal widths.

17. The method of claim 13, wherein the first component data interface properties include signal direction.

18. The method of claim 13, wherein the first component data interface properties include purpose and function of a signal type.

19. The method of claim 1, further comprising supporting simple streams, packet streams, and frame streams, wherein said supporting the simple streams, packet streams, and frame streams is performed by a plurality of data interface adapters having virtual representations stored within the adapter library.

20. The method of claim 19, further comprising supporting channelized transfers, wherein said supporting the channelized transfers is performed by the plurality of data interface adapters.

21. The method of claim 20, further comprising supporting flexible frame formats, wherein said supporting the flexible frame formats is performed by the plurality of data interface adapters.

22. The method of claim 21, further comprising supporting multi-cycle beats, wherein said supporting the multi-cycle beats is performed by the plurality of data interface adapters.

23. The method of claim 22, further comprising supporting continuous and channel burst mechanisms, wherein said supporting the continuous and channel burst mechanisms is performed by the plurality of data interface adapters.

24. A programmable chip system generator, comprising:
storage means for storing data;
processing means for receiving a selection for a first component data interface including computer readable first component data interface properties and a selection for a second data interface including computer readable second component data interface properties, the processing means for automatically selecting a representation of a first adapter from an adapter library upon determining the first component data interface properties and the second component data interface properties, wherein the first and second component data interfaces are configured to communicate with each other and the first component data interface properties are different from the second component data interface properties.

* * * * *